(12) United States Patent
Ho (10) Patent No.: US 8,474,487 B2
(45) Date of Patent: Jul. 2, 2013

(54) LATCHING VALVE

(75) Inventor: Thanh Ho, Brunswick, OH (US)

(73) Assignee: Bendix Commercial Vehicle System LLC, Elyria, OH (US)

( * ) Notice: Subject to any disclaimer, the term of this patent is extended or adjusted under 35 U.S.C. 154(b) by 360 days.

(21) Appl. No.: 12/841,545

(22) Filed: Jul. 22, 2010

(65) Prior Publication Data

US 2012/0018003 A1    Jan. 26, 2012

(51) Int. Cl.
*F16K 11/07* (2006.01)
*F16K 11/18* (2006.01)

(52) U.S. Cl.
USPC ............. 137/625.66; 137/625.27; 137/625.64

(58) Field of Classification Search
USPC ............... 137/625.25, 625.27, 625.6, 625.65, 137/625.66, 625.64, 625.63, 596.15, 625.68
See application file for complete search history.

(56) References Cited

U.S. PATENT DOCUMENTS

| | | | | |
|---|---|---|---|---|
| 1,522,381 A | * | 1/1925 | Murphy | 60/412 |
| 2,639,728 A | * | 5/1953 | Briechle | 137/625.27 |
| 2,930,404 A | | 3/1960 | Kowalski et al. | |
| 3,016,917 A | | 1/1961 | Hunt | |
| 3,109,455 A | | 11/1963 | Horowitz et al. | |
| 3,403,699 A | | 10/1968 | Fites | |
| 3,584,646 A | | 6/1971 | Olmsted | |
| 3,939,870 A | * | 2/1976 | Guigliano | 137/624.27 |
| 4,128,110 A | | 12/1978 | Haytayan | |
| 4,458,645 A | | 7/1984 | Schwartzman | |
| 4,506,700 A | | 3/1985 | Kramer | |
| 4,806,082 A | * | 2/1989 | Schenk | 417/388 |
| 4,821,774 A | * | 4/1989 | Chorkey | 137/625.65 |
| 4,834,141 A | * | 5/1989 | Frisch | 137/625.66 |
| 4,838,308 A | | 6/1989 | Thomas et al. | |
| RE33,246 E | * | 7/1990 | Barree | 137/625.5 |
| 5,103,866 A | | 4/1992 | Foster | |
| 5,497,806 A | | 3/1996 | Swank et al. | |
| 5,918,631 A | | 7/1999 | Weiler, Jr. et al. | |
| 6,026,860 A | | 2/2000 | Teichmann | |
| 6,802,298 B2 | * | 10/2004 | Yoshimura et al. | 123/467 |

(Continued)

OTHER PUBLICATIONS

U.S. Office Action for related U.S. Appl. No. 12/841,441, dated Aug. 27, 2012.
Response to Non-Final Office Action issued Aug. 27, 2012 for related U.S. Appl. No. 12/841,441, filed Nov. 27, 2012.

*Primary Examiner* — John Rivell
*Assistant Examiner* — Daphne M Barry
(74) *Attorney, Agent, or Firm* — Calfree, Halter & Griswold LLP (57) ABSTRACT

A latching valve includes a housing, a supply port, defined in the housing, which receives supply pressure, a delivery port defined in the housing, an exhaust port, defined in the housing, and an apply port defined in the housing. A housing bore fluidly communicates with the supply port, the delivery port, the exhaust port, and the apply port fluidly. A shuttle is sealingly and movably secured in the housing bore. The shuttle is alternately set to one of an apply position and a release position as a function of sequential pilot pressures at the apply port acting on the shuttle, and as a function of the supply pressure acting on one of an apply pair of sealed seats with different diameters in the housing bore and a release pair of sealed seats with different diameters in the housing bore. The delivery port fluidly communicates with the supply port while the shuttle is in the apply position. The delivery port fluidly communicates with the exhaust port while the shuttle is in the release position.

19 Claims, 6 Drawing Sheets

U.S. PATENT DOCUMENTS

| | | |
|---|---|---|
| 6,860,292 B2 | 3/2005 | Fasolino et al. |
| 6,896,002 B2 | 5/2005 | Hart et al. |
| 7,234,650 B2 * | 6/2007 | Kuroyanagi et al. ...... 239/102.2 |
| 7,354,118 B2 | 4/2008 | Herbst |
| 8,104,511 B2 * | 1/2012 | Reilly ...................... 137/625.65 |
| 2004/0118463 A1 * | 6/2004 | Yamamoto ............... 137/625.65 |
| 2006/0065315 A1 * | 3/2006 | Neff et al. ................ 137/625.65 |
| 2007/0215223 A1 | 9/2007 | Morris |

* cited by examiner

LATCHING VALVE

BACKGROUND

The present invention relates to a latching valve. It finds particular application in conjunction with single piloting solenoid valves and will be described with particular reference thereto. It will be appreciated, however, that the invention is also amenable to other applications.

Some control systems for air-operated devices utilize solenoid valves that are turned on and off by electronic control switches. A "normally closed" solenoid valve remains in a closed state until an activation signal (e.g., an electronic activation signal) is received by the solenoid valve. The "normally closed" solenoid valve transitions to an open state for only as long as the activation signal is applied to the solenoid valve (e.g., as long as the solenoid valve is energized). The normally closed solenoid valve returns to the closed state when the activation signal is no longer received by the solenoid valve. A "normally open" solenoid valve remains in a open state until an activation signal is received by the solenoid valve. The "normally open" solenoid valve transitions to a closed state for only as long as the activation signal is applied to the solenoid valve (e.g., as long as the solenoid valve is energized). The normally open solenoid valve returns to the open state when the activation signal is no longer received by the solenoid valve. A latching solenoid valve remains in either the closed state or the open state until an activation signal is received. The latching solenoid valve switches to the other state (e.g., switches from the closed state to the open state, or vice-versa) when the activation signal is received, and remains in the other state until the next activation signal is received.

The present invention provides a new and improved apparatus and method which addresses the above-referenced problems.

SUMMARY

In one aspect of the present invention, it is contemplated that a latching valve includes a housing, a supply port, defined in the housing, which receives supply pressure, a delivery port defined in the housing, an exhaust port, defined in the housing, and an apply port defined in the housing. A housing bore fluidly communicates with the supply port, the delivery port, the exhaust port, and the apply port fluidly. A shuttle is sealingly and movably secured in the housing bore. The shuttle is alternately set to one of an apply position and a release position as a function of sequential pilot pressures at the apply port acting on the shuttle, and as a function of the supply pressure acting on one of an apply pair of sealed seats with different diameters in the housing bore and a release pair of sealed seats with different diameters in the housing bore. The delivery port fluidly communicates with the supply port while the shuttle is in the apply position. The delivery port fluidly communicates with the exhaust port while the shuttle is in the release position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
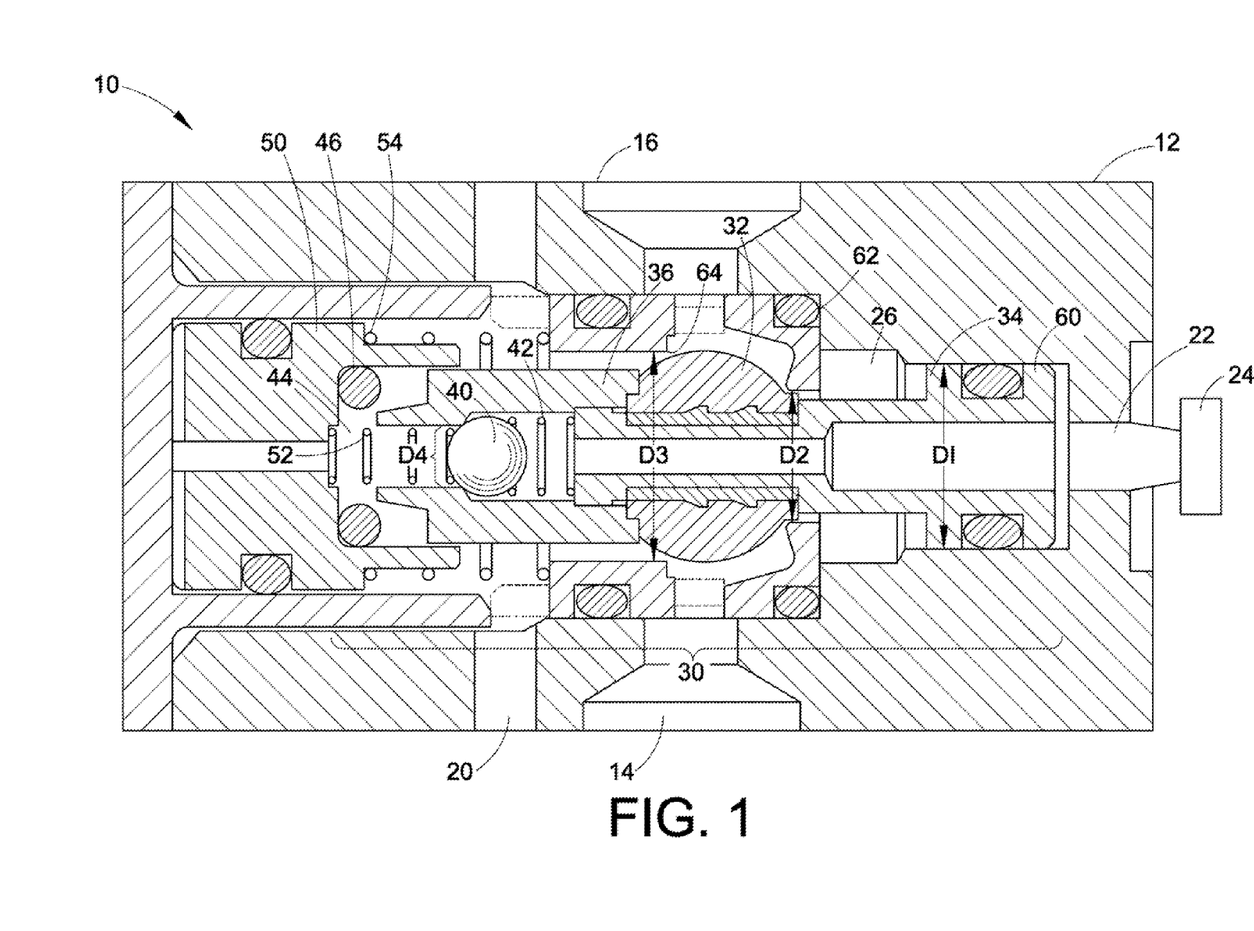
FIG. 1 illustrates a schematic representation of a valve in a latched release state in accordance with one embodiment of an apparatus illustrating principles of the present invention.

With reference to FIG. 1, a simplified component diagram of an exemplary latching valve 10 is illustrated in accordance with one embodiment of the present invention. The valve 10 includes a housing 12, a supply port 14 defined in the housing 12, a delivery port 16 defined in the housing 12, an exhaust port 20 defined in the housing 12, and an apply port 22 defined in the housing 12. As discussed in more detail below, application of a pilot pressure to the apply port 22 is controlled via a control valve 24 (e.g., a solenoid valve or a pneumatic valve). A supply pressure is provided at the supply port 14. A bore 26 is defined in the housing 12. The supply port 14, the delivery port 16, the exhaust port 20, and the apply port 22 fluidly communicate with the bore 26.

In one embodiment, it is contemplated that the control valve 24 is a "normally closed" valve. Therefore, the control valve 24 remains closed unless and until a control mechanism (not shown) transmits an apply activation signal to the control valve 24, which energizes the control valve 24. Upon receiving the apply activation signal from the control mechanism (e.g., when the control valve 24 is energized), the control valve 24 opens, and remains open, until the activation signal is no longer received from the control mechanism (e.g., until the control valve 24 is de-energized). In other words, the control valve 24 is only in the open state as long as the apply activation signal is received from the control mechanism; and the control valve 24 returns to the closed state after the apply activation signal is no longer received from the control mechanism (the control valve 24 is de-energized). Although it has been described that the control valve 24 is normally closed, it is to be understood that the control valve 24 may be of another type (e.g., normally open, etc). In addition, other types of valves (e.g., spring biased valves) are also contemplated.

As discussed in more detail below, although the control valve 24 merely provides a temporary pilot pressure to the apply port 22 (e.g., while the control valve 24 is energized), the latching valve 10 will change from an apply state to a release state (or from the release state to the apply state) after the pilot pressure is removed (e.g., while the control valve 24 is de-energized). The latching valve 10 remains in either the apply state or the release state after the pilot pressure is removed from the apply port 22. Therefore, the latching valve 10 may be referred to as a latching valve or a single solenoid latching valve.

A shuttle 30 is sealingly and movably secured in the bore 26. The shuttle 30 is alternately set to a release position (see FIGS. 1 and 4) and an apply position (see FIGS. 2 and 3) as a function of sequential pressures at the apply port 22, which act on the shuttle 30, and as a function of the supply pressure acting on either an apply pair of sealed seats having different diameters in the bore 26, or a release pair of sealed seats with different diameters in the bore 26. The latching valve 10 is in the release state when the shuttle 30 is in the release position; and the latching valve 10 is in the apply state when the shuttle 30 is in the apply position. The apply pair of sealed seats and the release pair of sealed seats are discussed in more detail below. The delivery port 16 fluidly communicates with the supply port 14 (e.g., around the shuttle 30) while the shuttle 30 is in the apply position (see FIGS. 2 and 3). The delivery port 16 fluidly communicating with the exhaust port 20 (e.g., around the shuttle 30) while the shuttle 30 is in the release position (see FIGS. 1 and 4).

The shuttle 30 includes an inlet sealing member 32, an apply piston 34, a mode select valve 36, a mode select sealing member 40, and a bypass spring 42. The apply piston 34 fluidly communicates with the apply port 22 and the supply port 14, and moves as a unitary object with the inlet sealing member 32. The mode select valve 36 also moves as a unitary object with the inlet sealing member 32. A mode select valve outlet 44 is defined at one end of the mode select valve 36. The mode select valve 36 moves between an open position and a closed position. While in the open position, the mode select valve outlet 44 fluidly communicates with the exhaust port 20. While in the closed position, the mode select valve outlet 44 is fluidly isolated from the exhaust port 20 since the mode select valve 36 sealingly engages a mode select outlet sealing member 46 (e.g., an o-ring). The mode select sealing member 40 moves between an unsealed position, during which the apply port 22 fluidly communicates with the mode select valve outlet 44, and a sealed position, during which the apply port 22 does not fluidly communicate with the mode select valve outlet 44. The bypass spring 42 biases the mode select sealing member 40 to the sealed position.

Figure 2:
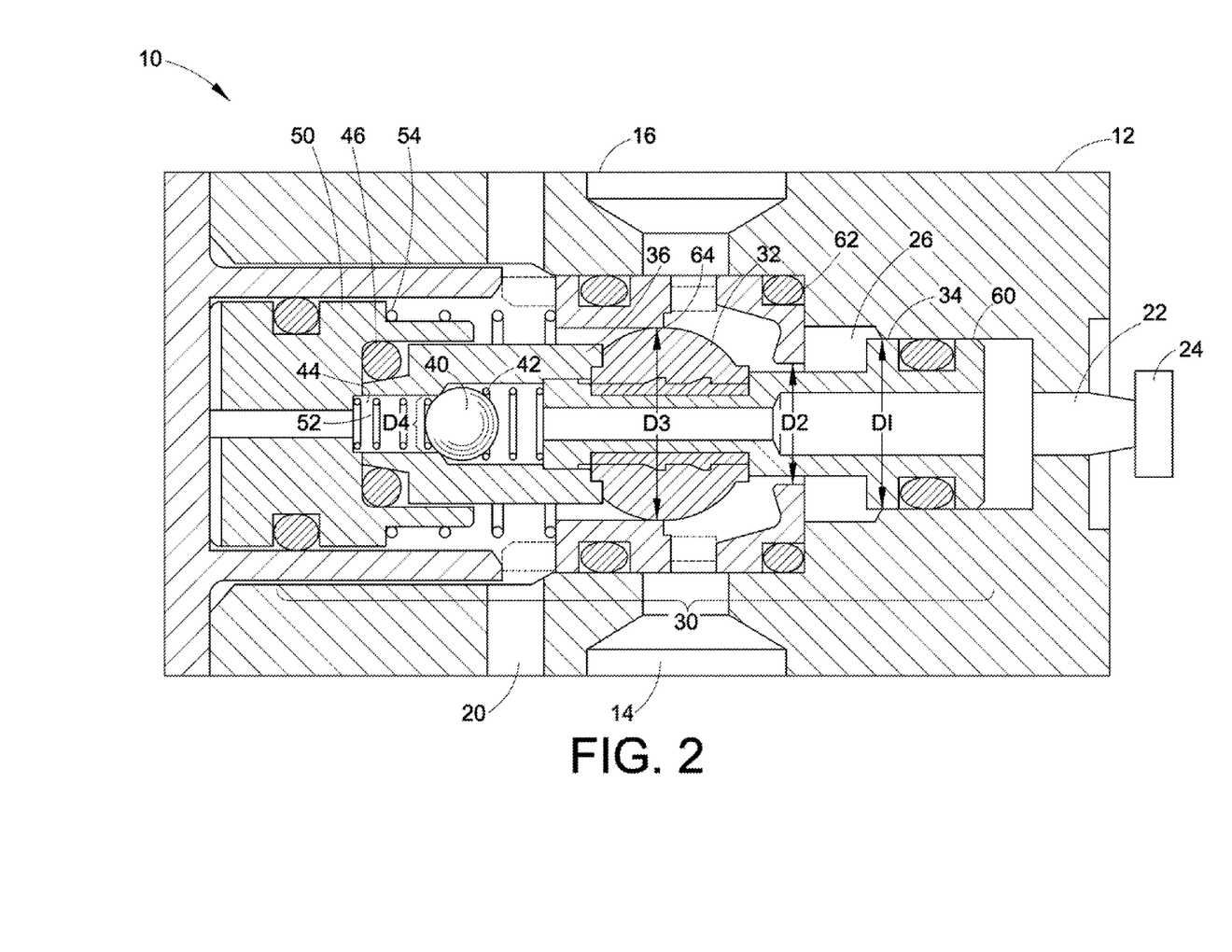
FIG. 2 illustrates a schematic representation of the valve of FIG. 1 in an apply state in accordance with one embodiment of an apparatus illustrating principles of the present invention.
Figure 3:
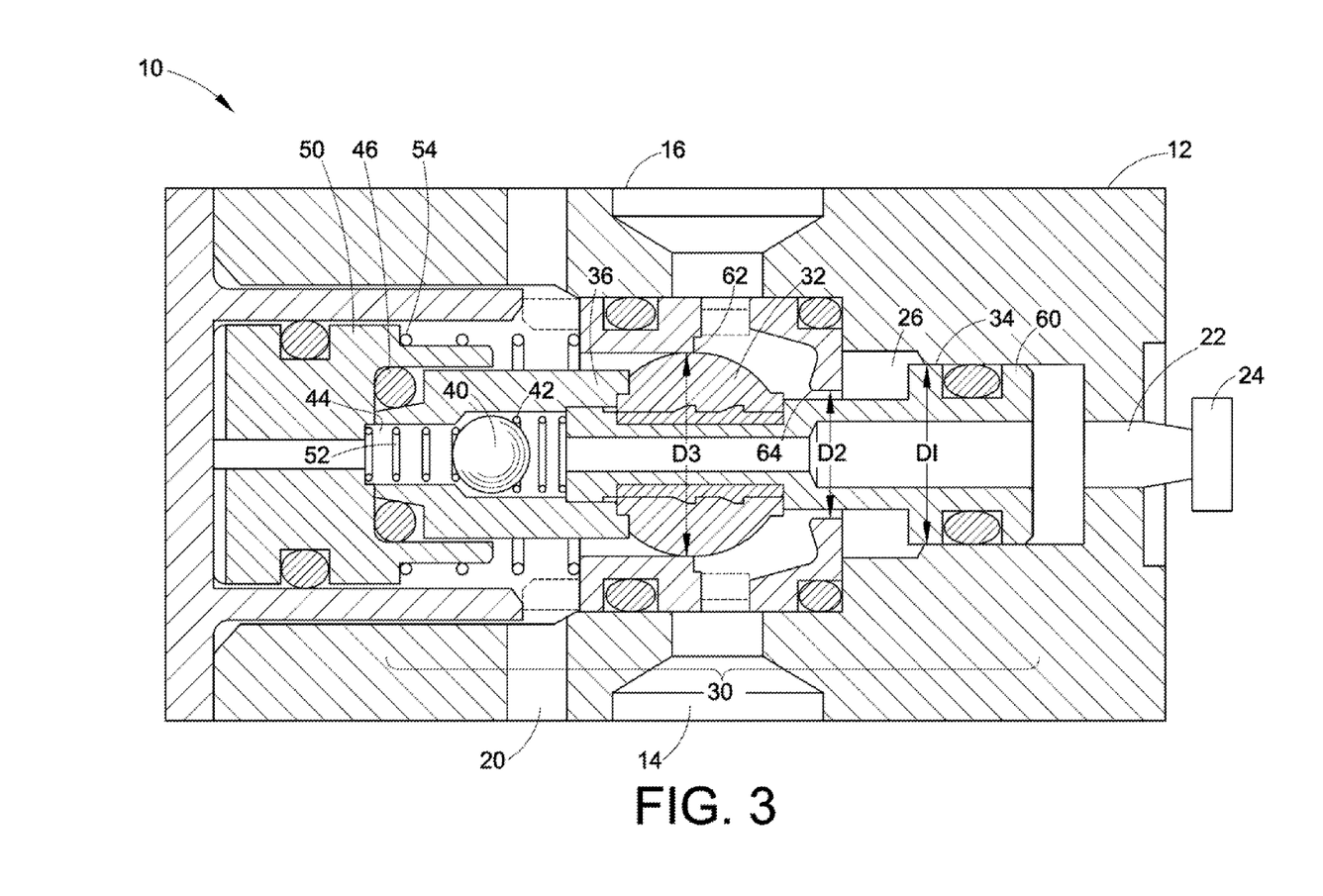
FIG. 3 illustrates a schematic representation of the valve of FIG. 1 in a latched apply state in accordance with one embodiment of an apparatus illustrating principles of the present invention.

A release piston 50 fluidly communicates with the mode select valve outlet 44. The release piston 50 is movable between an unapplied position (as illustrated in FIGS. 1-3) and an applied position (see FIG. 4). A mode select spring 52 is between the release piston 50 and the mode select sealing member 40. When compressed, the mode select spring 52 biases the mode select sealing member 40 to the unsealed position. A return spring 54 biases the release piston 50 away from the mode select valve 36.

An apply piston seal seat 60 is created between the apply piston 34 and the housing bore 26. The inlet sealing member 32 is sealed at an inlet seat 62 in the housing bore 26 when the shuttle 30 is in the release position. The inlet sealing member 32 is sealed at an exhaust seat 64 in the housing bore 26 when the shuttle 30 is in the apply position.

The release pair of sealed seats in the housing bore 26 include the apply piston seal seat 60 and the inlet seat 62. A diameter D1 of the apply piston seal seat 60 is greater than a diameter D2 of the inlet seat 62. The apply pair of sealed seats in the housing bore 26 include the apply piston seal seat 60 and the exhaust seat 64. The diameter D1 of the apply piston seal seat 60 is less than a diameter D3 of the exhaust seat 64.

When the shuttle 30 is in the release position (e.g., when the shuttle 30 is latched in the release position as illustrated in FIG. 1), the supply pressure acts on the relatively larger diameter D1 of the apply piston seal seat 60 and the relatively smaller diameter D2 of the inlet seat 62 to urge the shuttle 30 to the release position for maintaining (e.g., latching) the shuttle 30 in the release position until an apply pilot pressure is supplied to the apply port 22 (e.g., until the control valve 24 is energized).

When the shuttle 30 is latched in the release position (see FIG. 1), no pilot pressure is supplied to the apply port 22, the mode select sealing member 40 is sealed against the mode select valve 36, the mode select valve outlet 44 fluidly communicates with the exhaust port 20, and the return spring 54 urges the release piston 50 to the unapplied position. While in this state, an apply pilot pressure supplied to the apply port 22 acts on the mode select sealing member 40 to move the shuttle 30 from the release position to the apply position (see FIG. 2). A pneumatic force generated at a diameter D4, at the location on the mode select valve 36 where the mode select sealing member 40 seats, is larger than a compressive force of the mode select spring 52 acting on the mode select sealing member 40. As illustrated in FIG. 2, the mode select valve outlet 44 is fluidly independent of (sealed from) the exhaust port 20 because the mode select valve 36 sealingly engages the mode select outlet sealing member 46. After the shuttle 30 is moved from the release position (see FIG. 1) to the apply position (see FIG. 2), and after the pilot pressure is removed from the apply port 22 (e.g., after the control valve 24 is de-energized) (see FIG. 3), the bias of the mode select spring 52 overcomes the bias of the bypass spring 42, as illustrated in FIG. 3, to unseal the mode select sealing member 40 from the mode select valve 36. Also, the mode select valve outlet 44 remains sealed from the exhaust port 20.

When the shuttle 30 is in the apply position (e.g., when the shuttle 30 is latched in the apply position as illustrated in FIG. 3), the supply pressure acts on the relatively larger diameter D3 of the exhaust seat 64 and the relatively smaller diameter D1 of the apply piston seal seat 60 to urge the shuttle 30 to the apply position for maintaining (e.g., latching) the shuttle 30 in the apply position until a release pilot pressure is supplied to the apply port 22 (e.g., until the control valve 24 is energized).

Figure 4:
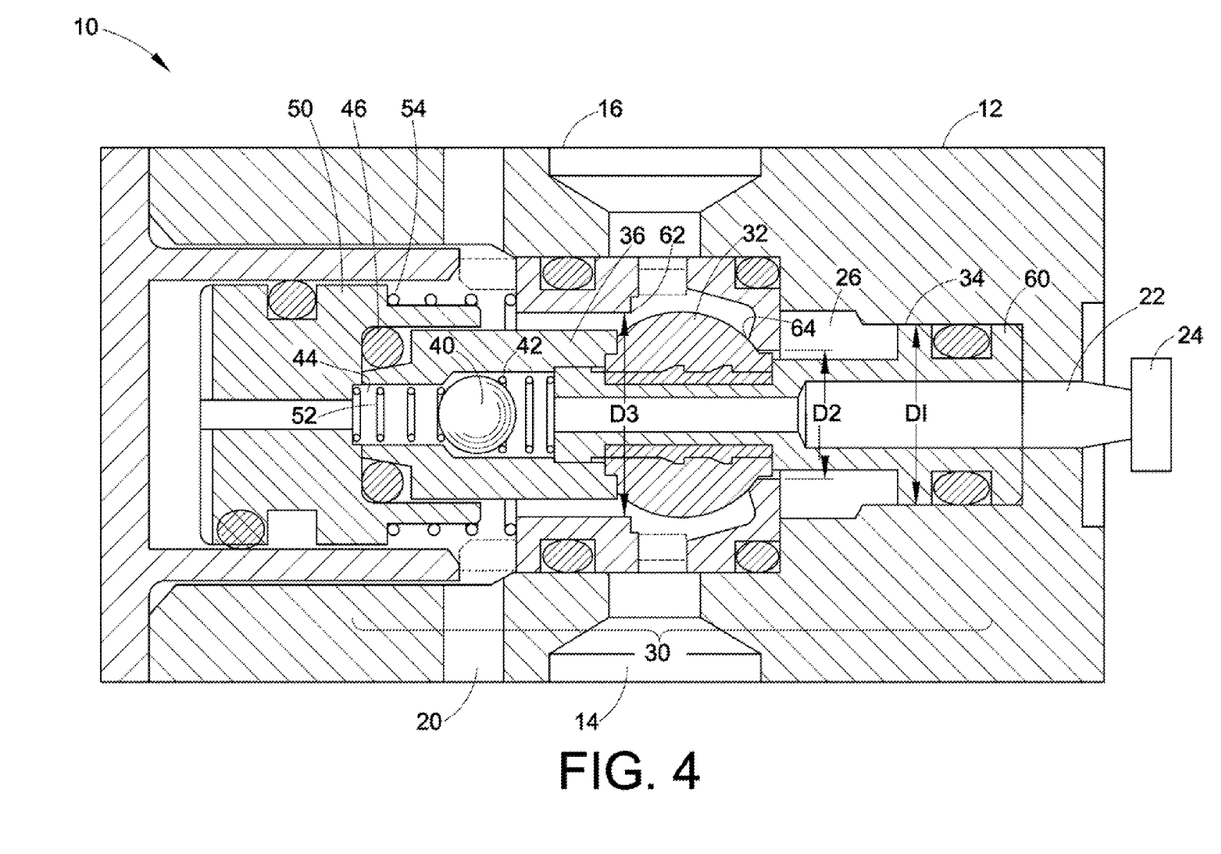
FIG. 4 illustrates a schematic representation of the valve of FIG. 1 in a release state in accordance with one embodiment of an apparatus illustrating principles of the present invention.

When the shuttle 30 is latched in the apply position (see FIG. 3), no pilot pressure is supplied to the apply port 22, the mode select sealing member 40 is not sealed against the mode select valve 36, the mode select valve outlet 44 does not fluidly communicate with the exhaust port 20, and the return spring 54 urges the release piston 50 to the unapplied position. While in this state, a release pilot pressure supplied to the apply port 22 moves the release piston 50 to the applied position which, in turn, moves the shuttle 30 from the apply position to the release position (see FIG. 4). As illustrated in FIG. 4, the mode select valve outlet 44 is fluidly independent of (sealed from) the exhaust port 20 because the mode select valve 36 sealingly engages the mode select outlet sealing member 46. After the shuttle 30 is moved from the apply position (see FIG. 3) to the release position (see FIG. 4), and after the pilot pressure is removed from the apply port 22 (e.g., after the control valve 24 is de-energized) (see FIG. 1), the bias of the return spring 54 moves the release piston from the applied position to the unapplied position while the shuttle 30 remains in the release position as illustrated in FIG. 1. At this point, the mode select valve outlet 44 fluidly communicates with the exhaust port 20 so that any air at the mode select valve outlet 44 or the release piston 50 is exhausted via the exhaust port 20. Also, the bias of the bypass spring 42 overcomes the bias of the mode select spring 52 to seal the mode select sealing member 40 against the mode select valve 36.

Figure 5:
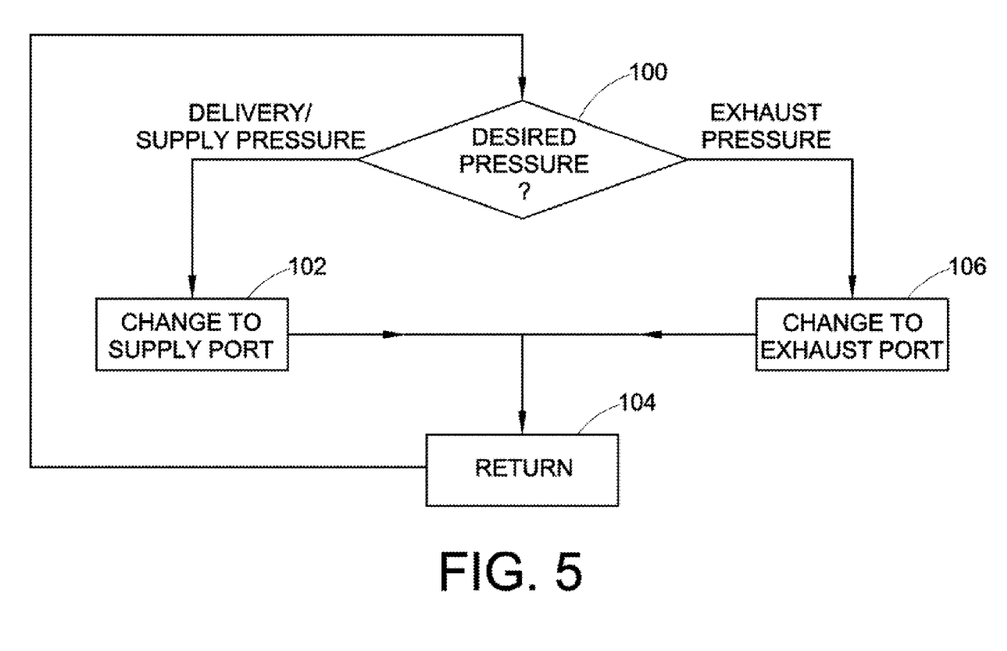
FIG. 5 is an exemplary methodology of the operation of the valve in FIGS. 1-4 in accordance with one embodiment illustrating principles of the present invention.

With reference to FIG. 5, an exemplary methodology of the system shown in FIGS. 1-4 is illustrated. As illustrated, the blocks represent functions, actions and/or events performed therein. It will be appreciated that the illustrated blocks and described sequences can be performed in different sequences.

In a step 100, it is determined whether a delivery pressure (e.g., the supply pressure) or an exhaust pressure (e.g., atmosphere pressure) is desired at a delivery port 16. If it is determined in the step 100, that the delivery pressure (supply pressure) is desired at the delivery port 16 while the delivery port 16 is fluidly communicating with the exhaust port 20, the method passes to a step 102 for changing the delivery port 16 from fluidly communicating with the exhaust port 20 to fluidly communicating with the supply port 14. The method then passes to the step a step 104 for returning to the step 100. Otherwise, if it is determined in the step 100, that the exhaust pressure (atmosphere pressure) is desired at the delivery port 16 while the delivery port 16 is fluidly communicating with the supply port 14, the method passes to a step 106 for changing the delivery port 16 from fluidly communicating with the supply port 14 to fluidly communicating with the exhaust port 20. The method then passes to the step the step 104 for returning to the step 100.

Figure 6:
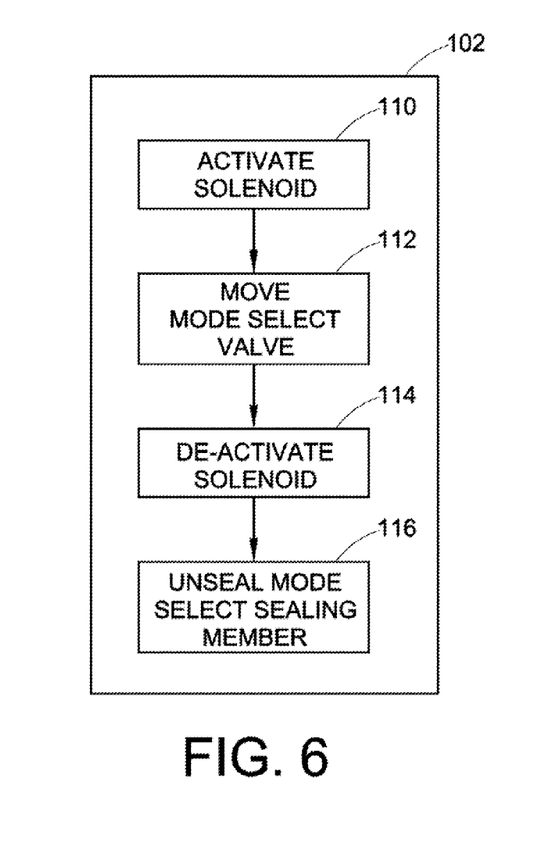
FIG. 6 is an exemplary methodology of one of the steps in FIG. 5 in accordance with one embodiment illustrating principles of the present invention.

With reference to FIG. 6, the step 102 of changing the delivery port 16 from fluidly communicating with the exhaust port 20 to fluidly communicating with the supply port 14 includes activating the control valve 24 in a step 110 to apply a pilot pressure to the apply port 22 for unsealing the inlet sealing member 32 from the inlet seat 62. The pilot pressure is continued to be applied to the apply port 22 until the inlet sealing member 32 is moved within the bore 26 and sealingly engages the exhaust seat 64. The mode select valve 36 is moved with the inlet sealing member 32 in a step 112. The control valve 24 is de-activated in a step 114. The mode select sealing member 40 is unsealed from the mode select valve 36 (in a step 116) after the control valve 24 is de-activated.

Figure 7:
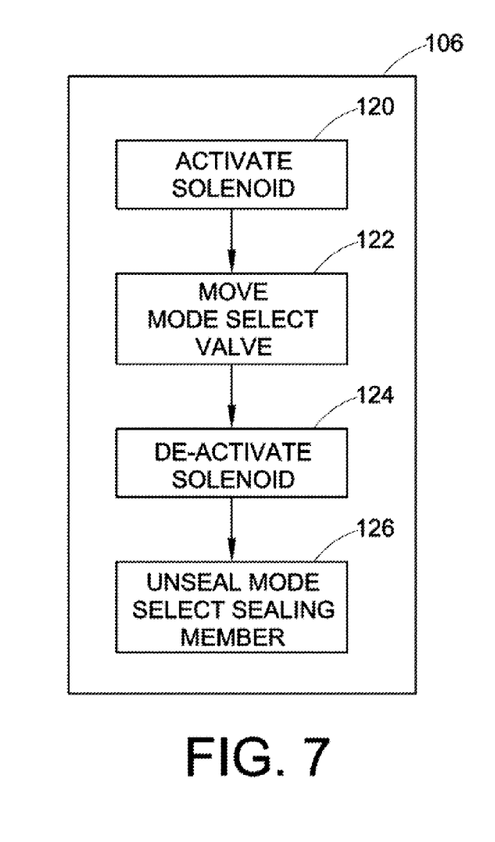
FIG. 7 is an exemplary methodology of one of the steps in FIG. 5 in accordance with one embodiment illustrating principles of the present invention.

With reference to FIG. 7, the step 106 of changing the delivery port 16 from fluidly communicating with the supply port 14 to fluidly communicating with the exhaust port 20 includes activating the control valve 24 in a step 120 to provide air behind the release piston 50 for unsealing the inlet sealing member 32 from the exhaust seat 64. The pilot pressure is continued to be applied to the apply port 22 until the inlet sealing member 32 is moved within the bore 26 and sealingly engages the inlet seat 62. The mode select valve 36 is moved with the inlet sealing member 32 in a step 122. The control valve 24 is de-activated in a step 124. The mode select valve outlet 44 is unsealed from the exhaust port 20 (in a step 126) after the control valve 24 is de-activated.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A latching valve, comprising:
a housing;
a supply port, defined in the housing, receiving supply pressure;
a delivery port defined in the housing;
an exhaust port, defined in the housing;
an apply port defined in the housing;
an inlet sealing member;
an apply piston, fluidly communicating with the apply port and the supply port, moving as a unitary object with the inlet sealing member;
a mode select valve, moving as a unitary object with the inlet sealing member, having a mode select valve outlet, the mode select valve moving between an open position, when the mode select valve outlet fluidly communicates with the exhaust port, and a closed position when the mode select valve outlet does not fluidly communicate with the exhaust port;
a mode select sealing member moving between an unsealed position against the mode select valve, during which the apply port fluidly communicates with the mode select valve outlet, and a sealed position, during which the apply port does not fluidly communicate with the mode select valve outlet;
a bypass spring biasing the mode select sealing member to the sealed position,
a housing bore, the supply port, the delivery port, the exhaust port, and the apply port fluidly communicating with the housing bore; and
a shuttle, sealingly and movably secured in the housing bore, alternately set to one of an apply position and a release position as a function of sequential pilot pressures at the apply port, acting on the shuttle, and as a function of the supply pressure acting on one of an apply pair of sealed seats with different diameters in the housing bore and a release pair of sealed seats with different diameters in the housing bore, the delivery port fluidly communicating with the supply port while the shuttle is in the apply position, and the delivery port fluidly communicating with the exhaust port while the shuttle is in the release position.

2. The latching valve as set forth in claim 1, further including:
a release piston fluidly communicating with the mode select valve outlet and movable between an unapplied position and an applied position;
a mode select spring, between the release piston and the mode select sealing member, the mode select spring, when compressed, biasing the mode select sealing member to the unsealed position; and
a return spring biasing the release piston away from the mode select valve.

3. The latching valve as set forth in claim 2, wherein:
an apply piston seal seat is created between the apply piston and the housing bore;
the inlet sealing member is sealed at an inlet seat in the housing bore when the shuttle is in the release position;
the release pair of sealed seats in the housing bore includes the apply piston seal seat and the inlet seat;
a diameter of the apply piston seal seat is greater than a diameter of the inlet seat; and
when the shuttle is in the release position, the supply pressure acting on the relatively larger diameter of the apply piston seal seat and the relatively smaller diameter of the inlet seat urges the shuttle to the release position to latch the shuttle in the release position until a pilot pressure is supplied to the apply port.

4. The latching valve as set forth in claim 3, wherein when the shuttle is latched in the release position:
the mode select sealing member is sealed against the mode select valve;
the mode select valve outlet fluidly communicates with the exhaust port;
the return spring urges the release piston to the unapplied position; and
the pilot pressure supplied to the apply port moves the shuttle from the release position to the apply position and seals the mode select valve outlet from the exhaust port.

5. The latching valve as set forth in claim 4, wherein after the shuttle is moved from the release position to the apply position and after the pilot pressure is removed:
the bias of the mode select spring overcomes the bias of the bypass spring to unseal the mode select sealing member from the mode select valve; and
the mode select valve outlet remains sealed from the exhaust port.

6. The latching valve as set forth in claim 4, wherein:
the inlet sealing member is sealed at an exhaust seat in the housing bore when the shuttle is in the apply position;
the apply pair of sealed seats in the housing bore includes the apply piston seal seat and the exhaust seat;
the diameter of the apply piston seal seat is less than a diameter of the exhaust seat; and
when the shuttle is in the apply position, the supply pressure acting on the relatively larger diameter of the exhaust seat and the relatively smaller diameter of the apply piston seal seat urges the shuttle to the apply position to latch the shuttle in the apply position until a next pilot pressure is supplied to the apply port.

7. The latching valve as set forth in claim 6, wherein when the shuttle is latched in the apply position:
the mode select sealing member is not sealed against the mode select valve;
the mode select valve outlet does not fluidly communicate with the exhaust port;
the return spring urges the release piston to the unapplied position; and
the next pilot pressure supplied to the apply port moves the release piston to the applied position which, in turn, moves the shuttle from the apply position to the release position.

8. The latching valve as set forth in claim 7, wherein after the shuttle is moved from the applied position to the release position and after the next pilot pressure is removed:
the return spring moves the release piston from the applied position to the unapplied position;
the bias of the bypass spring overcomes the bias of the mode select spring to seal the mode select sealing member against the mode select valve.

9. The latching valve as set forth in claim 1, wherein:
while the shuttle is in the apply position, the delivery port fluidly communicates with the supply port around the shuttle; and
while the shuttle is in the release position, the delivery port fluidly communicating with the exhaust port around the shuttle.

10. A method of latching a valve, the method comprising:
determining whether one of a delivery pressure and an exhaust pressure is desired at a delivery port;
if it is desired to change the delivery port from fluidly communicating with the exhaust port to fluidly communicating with the supply port:
applying a pilot pressure to an apply port to unseal an inlet sealing member from an inlet seat while a supply pressure at the supply port is acting on an apply piston seal seat, which is between an apply piston and a housing bore, and the inlet seat that acts to urge the inlet sealing member to seal on the inlet seat because a diameter of the apply piston seal seat is relatively larger than a diameter of the inlet seat;
continuing to apply the pilot pressure until the inlet sealing member is moved within the housing bore to sealingly engage an exhaust seat so that the delivery port fluidly communicates with the supply port;
moving a mode select valve with the inlet sealing member so that a mode select valve outlet is sealed from the exhaust port; and
removing the pilot pressure from the apply port so that the supply pressure acts on the apply piston seal seat and the exhaust seat to latch the inlet sealing member to seal on the exhaust seat because a diameter of the exhaust seat is relatively larger than the diameter of the apply piston seal seat, so that a mode select spring biases a mode select sealing member to unseal from the mode select valve; and
if it is desired to change the delivery port from fluidly communicating with the supply port to fluidly communicating with the exhaust port:
applying a pilot pressure to the apply port to unseal the inlet sealing member from the exhaust seat while the supply pressure at the supply port is acting on the apply piston seal seat and the exhaust seat to urge the inlet sealing member to seal on the exhaust seat because the diameter of the exhaust seat is relatively larger than the diameter of the apply piston seal seat;
continuing to apply the pilot pressure until the inlet sealing member is moved within the housing bore to sealingly engage the inlet seat so that the delivery port fluidly communicates with the exhaust port;
removing the pilot pressure from the apply port so that a bypass spring biases the mode select sealing member to seal against the mode select valve and so that the supply pressure acts on the apply piston seal seat and the inlet seat to latch the inlet sealing member to seal on the inlet seat because the diameter of the apply piston seal seat is relatively larger than the diameter of the inlet seat; and
moving the mode select valve with the inlet sealing member so that the mode select valve outlet is not sealed from the exhaust port.

11. The method of latching a valve as set forth in claim 10, wherein the steps of applying the pilot pressure to the apply port include:
activating a control valve.

12. The method of latching a valve as set forth in claim 10, wherein the step of applying the pilot pressure to the apply port to unseal the inlet sealing member from the exhaust seat includes:
passing the pilot pressure by the mode select sealing member to move a release piston toward the mode select valve to seal the mode select valve outlet from the exhaust port.

13. The method of latching a valve as set forth in claim 12, wherein the step of moving the mode select valve so that the mode select valve outlet is not sealed from the exhaust port includes:

after the pilot pressure is removed from the apply port, moving the release piston away from the mode select valve to provide fluid communication between the mode select valve outlet and the exhaust port.

14. The method of latching a valve as set forth in claim 13, wherein the step of moving the mode select valve so that the mode select valve outlet is not sealed from the exhaust port also includes:
biasing the bypass spring to overcome the bias of the mode select spring so the mode select sealing member sealingly engages the mode select valve.

15. The method of latching a valve as set forth in claim 12, wherein the step of moving the mode select valve so that the mode select valve outlet is sealed from the exhaust port includes:
engaging the mode select valve outlet with a release piston.

16. The method of latching a valve as set forth in claim 15, wherein moving a mode select valve with the inlet sealing member so that a mode select spring biases a mode select sealing member to unseal from the mode select valve includes:
biasing the mode select spring to overcome the bias of the bypass spring so the mode select sealing member does not sealingly engage the mode select valve.

17. A latching valve system, comprising:
a housing;
a supply port, defined in the housing, receiving supply pressure;
a delivery port defined in the housing;
an exhaust port, defined in the housing;
an apply port defined in the housing;
an apply solenoid supplying an apply pilot pressure to the apply port as a function of a state of the apply solenoid;
an inlet sealing member;
an apply piston, fluidly communicating with the apply port and the supply port, moving as a unitary object with the inlet sealing member;
a mode select valve, moving as a unitary object with the inlet sealing member, having a mode select valve outlet, the mode select valve moving between an open position, when the mode select valve outlet fluidly communicates with the exhaust port, and a closed position when the mode select valve outlet does not fluidly communicate with the exhaust port;
a mode select sealing member moving between an unsealed position against the mode select valve, during which the apply port fluidly communicates with the mode select valve outlet, and a sealed position, during which the apply port does not fluidly communicate with the mode select valve outlet;
a bypass spring biasing the mode select sealing member to the sealed position,
a housing bore, the supply port, the delivery port, the exhaust port, and the apply port fluidly communicating with the housing bore; and
a shuttle, sealingly and movably secured in the housing bore, alternately set to one of an apply position and a release position as a function of sequential pilot pressures at the apply port, acting on shuttle, and as a function of the supply pressure acting on one of an apply pair of sealed seats with different diameters in the housing bore and a release pair of sealed seats with different diameters in the housing bore, the delivery port fluidly communicating with the supply port while the shuttle is in the apply position, and the delivery port fluidly communicating with the exhaust port while the shuttle is in the release position.

18. The latching valve system as set forth in claim 17, wherein an apply piston seal seat is created between the apply piston and the housing bore, and wherein when the shuttle is latched in the release position:
the inlet sealing member is sealed at an inlet seat in the housing bore;
the respective pair of differently diametered sealed seats includes the apply piston seal seat and the inlet seat;
a diameter of the apply piston seal seat is greater than a diameter of the inlet seat;
the supply pressure acting on the relatively larger diameter of the apply piston seal seat and the relatively smaller diameter of the inlet seat urges the shuttle to the release position to latch the shuttle in the release position until an apply pilot pressure is supplied to the apply port;
the apply pilot pressure supplied to the apply port acts on a mode select sealing member to set the shuttle to the apply position so the inlet sealing member is sealed at an exhaust seat in the housing bore; and
after the apply pilot pressure is removed from the apply port, the respective pair of differently diametered sealed seats includes the apply piston seal seat and the exhaust seat, which is larger than the apply piston seal seat, the supply pressure acting on the relatively larger diameter of the exhaust seat and the relatively smaller diameter of the apply piston seal seat urging the shuttle to the apply position to latch the shuttle in the apply position until a release pilot pressure is supplied to the apply port.

19. The latching valve system as set forth in claim 18, wherein when the shuttle is latched in the apply position:
an inlet sealing member is sealed at the exhaust seat in the housing bore;
the respective pair of differently diametered sealed seats includes the apply piston seal seat and the exhaust seat;
a diameter of the exhaust seat is greater than a diameter of the apply piston seal seat;
the supply pressure acting on the relatively larger diameter of the exhaust seat and the relatively smaller diameter of the apply piston seal seat urges the shuttle to the apply position to latch the shuttle in the apply position until the release pilot pressure is supplied to the apply port;
the release pilot pressure supplied to the apply port acts on a release piston to set the shuttle to the release position so the inlet sealing member is sealed at the inlet seat in the housing bore; and
after the release pilot pressure is removed from the apply port, the respective pair of differently diametered sealed seats includes the inlet seat and the apply piston seal seat, which is larger than the inlet seat, the supply pressure acting on the relatively larger diameter of the apply piston seal seat and the relatively smaller diameter of the inlet seat urging the shuttle to the release position to latch the shuttle in the release position until an apply pilot pressure is supplied to the apply port.

* * * * *